US012542099B2

(12) United States Patent
Chung et al.

(10) Patent No.: US 12,542,099 B2
(45) Date of Patent: Feb. 3, 2026

(54) DISPLAY APPARATUS AND DRIVING METHOD FOR THE SAME

(71) Applicant: LG Display Co., Ltd., Seoul (KR)

(72) Inventors: Moonsoo Chung, Paju-si (KR); Wookyu Sang, Paju-si (KR); Taehun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/919,300

(22) Filed: Oct. 17, 2024

(65) Prior Publication Data

US 2025/0148965 A1 May 8, 2025

(30) Foreign Application Priority Data

Nov. 3, 2023 (KR) ........................ 10-2023-0150957

(51) Int. Cl.
*G09G 3/32* (2016.01)

(52) U.S. Cl.
CPC ....... *G09G 3/32* (2013.01); *G09G 2300/0426* (2013.01); *G09G 2320/0252* (2013.01)

(58) Field of Classification Search
CPC ............. G09G 3/32; G09G 2300/0426; G09G 2320/0252; G09G 3/3233; G09G 2300/0842; G09G 2310/061; G09G 2310/08; G09G 2340/04
See application file for complete search history.

(56) References Cited

U.S. PATENT DOCUMENTS

2022/0199016 A1 6/2022 Kim et al.
2024/0257740 A1 * 8/2024 Lee ...................... G09G 3/3233

FOREIGN PATENT DOCUMENTS

KR 10-2022-0088132 A 6/2022
KR 10-2022-0094952 A 7/2022

* cited by examiner

*Primary Examiner* — Andrew Sasinowski

(74) *Attorney, Agent, or Firm* — Morgan, Lewis & Bockius LLP

(57) ABSTRACT

A display apparatus includes a display panel having a display area including a plurality of subpixels. At least one of the plurality of subpixels may include: a driving transistor having a first electrode connected to a first power line configured to receive a first power voltage; a first switching transistor connected to a data line and having a gate electrode configured to receive a first scan signal; a second switching transistor connected between a gate electrode and a second electrode of the driving transistor and having a gate electrode configured to receive a second scan signal; and a third switching transistor connected with the gate electrode of the driving transistor and having a gate electrode configured to receive an emission control signal.

20 Claims, 12 Drawing Sheets

DISPLAY APPARATUS AND DRIVING METHOD FOR THE SAME

CROSS-REFERENCE TO RELATED APPLICATIONS

This application claims the benefit of and the priority to Korean Patent Application No. 10-2023-0150957 filed on Nov. 3, 2023, which is hereby incorporated by reference as if fully set forth herein.

BACKGROUND

Field

The present disclosure relates to a display apparatus and a driving method for the same.

Description of the Related Art

A display apparatus is widely used as a display screen of a laptop computer, a tablet computer, a smart phone, a portable display device, and a portable information device in addition to being used as a display screen of a television or a monitor. Recently, there is an increasing need for a large-scaled display apparatus for a large-scaled electronic device, such as an automobile.

Such a large-scaled display apparatus has a plurality of display areas, and a method capable of freely adjusting a ratio of each display area in accordance with a user's request or a display image will be required.

SUMMARY

Accordingly, the present disclosure is directed to a display apparatus and a driving method for the same that substantially obviate one or more of the problems due to limitations and disadvantages of the related art.

It is an object of the present disclosure to provide a display apparatus in which a ratio of a plurality of display areas may be adjusted and a response speed may be improved.

In addition to the objects of the present disclosure described above, additional objects and features of the present disclosure can be clearly understood by those skilled in the art from the following description of the present disclosure.

To achieve these objects and other advantages of the present disclosure, as embodied and broadly described herein, a display apparatus may include a display panel having a display area including a plurality of subpixels, at least one of the plurality of subpixels including: a driving transistor having a first electrode connected to a first power line configured to receive a first power voltage; a first switching transistor connected to a data line and having a gate electrode configured to receive a first scan signal; a second switching transistor connected between a gate electrode and a second electrode of the driving transistor and having a gate electrode configured to receive a second scan signal; and a third switching transistor connected with the gate electrode of the driving transistor and having a gate electrode configured to receive an emission control signal.

In accordance with another aspect of the present disclosure, a display apparatus may include a display panel including a plurality of subpixels, at least one of the plurality of subpixels including: a first switching transistor having a gate electrode configured to receive a first scan signal, a first electrode connected to a data line, and a second electrode connected to a first node; a driving transistor having a gate electrode connected to a second node, a first electrode connected to a first power line configured to receive a first power voltage, and a second electrode connected to a third node; a second switching transistor having a gate electrode configured to receive a second scan signal, a first electrode connected to the second node, and a second electrode connected to the third node; a third switching transistor having a gate electrode configured to receive an emission control signal, a first electrode connected to the first node, and a second electrode connected to an initialization voltage line configured to receive an initialization voltage; a storage capacitor connected between the first node and the second node; and at least one light emitting element connected between the third node and a second power line configured to receive a second power voltage.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
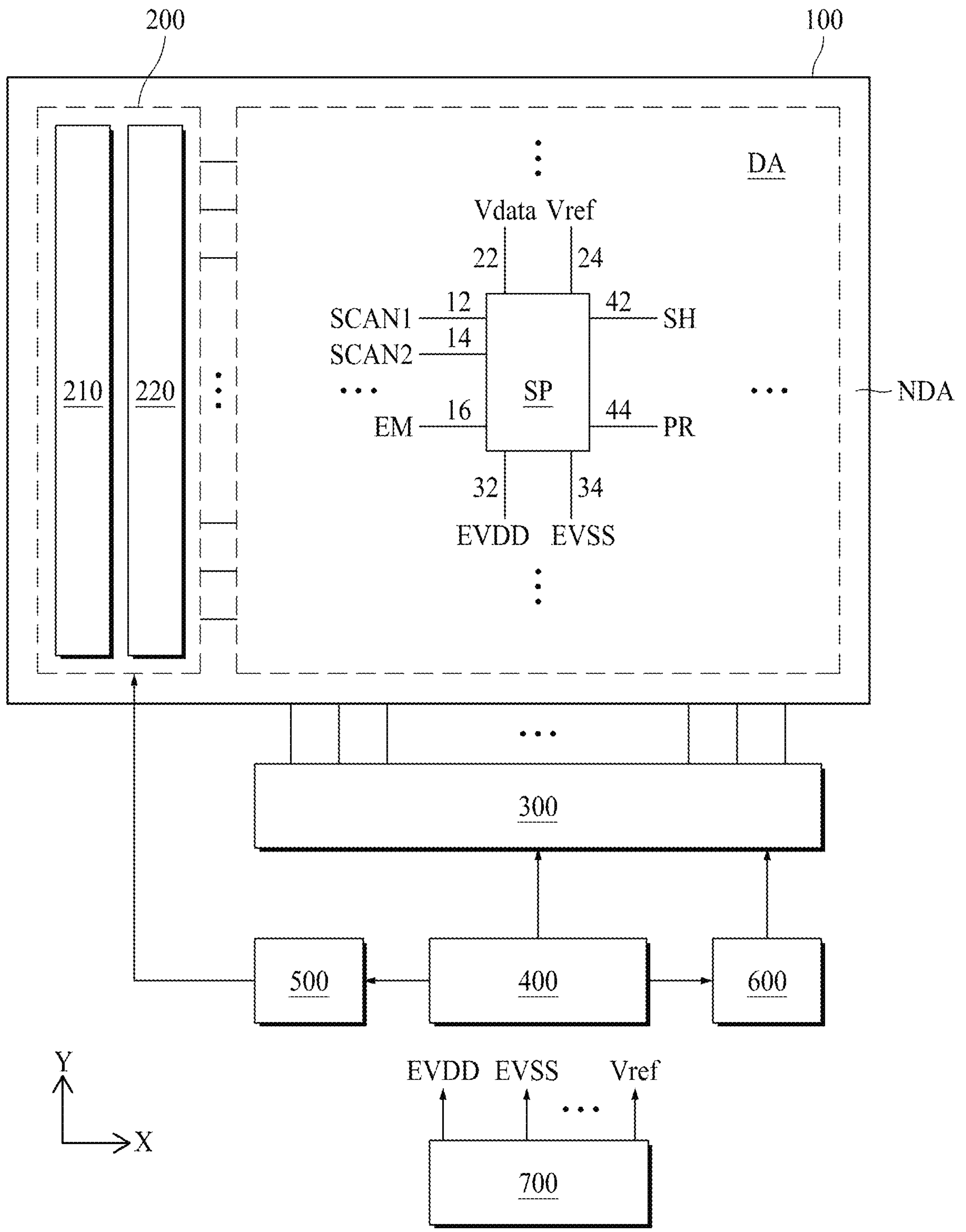
FIG. 1 is a schematic view illustrating a configuration of a display apparatus according to an example embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprise," "have," or "include" is used, one or more other elements may be added unless the term is used with a more limiting term, such as "only." An element described in a singular form may include a plurality of elements, and vice versa, unless the context clearly indicates otherwise.

In construing an element, the element should be construed as including an ordinary error or tolerance range even where no explicit description of such an error or tolerance range is provided.

Where a positional relationship between two elements is described with such a term as "on," "upon," "above," "below," "next to," or the like, one or more other elements may be located between the two elements unless the term is used with a more limiting term, such as "immediate(ly)" or "direct(ly)."

Where a temporal relationship is described using such a term as "after," "subsequent," "next," "before," or the like, it may include a non-consecutive or non-continuous case unless it is used with a more limiting term like "immediately" or "directly."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

Hereinafter, various example embodiments of the present disclosure will be described in detail with reference to the accompanying drawings.

FIG. 1 is a schematic view illustrating a configuration of a display apparatus according to an example embodiment of the present disclosure.

The display apparatus according to an example embodiment may be an electroluminescent display apparatus, such as an organic light emitting diode (OLED) display apparatus, a quantum-dot light emitting diode display apparatus, or an inorganic light emitting diode display (OLED) apparatus.

As shown in FIG. 1, the display apparatus according to an example embodiment may include a display panel 100, a gate driver 200, a data driver 300, a timing controller 400, a level shifter 500, a gamma voltage generator 600, and a power management circuit 700. In this case, the data driver 300, the timing controller 400, the level shifter 500, and the gamma voltage generator 600 may be integrated into a display driver.

The display panel 100 may be a flat panel display panel, or may be a flexible display panel whose shape may be modified, such as a foldable, bendable, rollable, or stretchable display panel.

The display panel 100 may include a display area DA for displaying an image and a non-display panel NDA surrounding the display area DA.

The display area DA may include a plurality of subpixels SP arranged in the form of a matrix. A subpixel matrix disposed in the display area DA may include a plurality of row lines and a plurality of column lines, which are respectively connected to a plurality of subpixels SP.

Each subpixel SP may be any one of a red subpixel for emitting red light, a green subpixel for emitting green light, a blue subpixel for emitting blue light, and a white subpixel for emitting white light. Also, a unit pixel may include at least two subpixels SP.

The display area DA may include a plurality of signal lines connected to each subpixel SP. The plurality of signal lines may include a plurality of gate lines 12, 14, and 16, a data line 22, a plurality of power lines 24, 32, and 34, and a plurality of mode control lines 42 and 44.

The plurality of gate lines 12, 14, and 16 may include first and second scan lines 12 and 14 and an emission control line 16. Each of the first and second scan lines 12 and 14 may supply first and second scan signals SCAN1 and SCAN2 supplied from the gate driver 200 to each corresponding subpixel SP, and the emission control line 16 may supply an emission control signal EM supplied from the gate driver 200 to each corresponding subpixel SP.

The data line 22 may supply a data voltage Vdata supplied from the data driver 300 to each corresponding subpixel SP.

The plurality of power lines 24, 32, and 34 may include an initialization voltage line 24, a first power line 32, and a second power line 34. The initialization voltage line 24 may supply an initialization voltage Vref supplied from the power management circuit 700 to each corresponding subpixel SP, the first power line 32 may supply a high potential power voltage EVDD to each corresponding subpixel SP, and the second power line 34 may supply a low potential power voltage EVSS to each corresponding subpixel SP.

The plurality of mode control lines 42 and 44 may include a first mode control line 42 and a second mode control line 44. The first mode control line 42 may supply a first mode control signal SH supplied from the data driver 300 or a separate mode controller (not shown) to each corresponding subpixel SP, and the second mode control line 44 may supply a second mode control signal PR supplied from the data driver 300 or a separate mode controller to each corresponding subpixel SP.

The display apparatus or the display panel 100 may selectively drive first and second light emitting elements of each subpixel SP through the plurality of mode control signals SH and PR. Therefore, the display area DA may be driven by being divided into a plurality of areas, and a ratio or size of each of the plurality of areas may be freely adjusted in first and second directions X and Y.

The gate driver 200 may be disposed in the non-display area NDA. The gate driver 200 may include a scan driver 210 and an emission control driver 220. The scan driver 210 may supply the first and second scan signals SCAN1 and SCAN2 to the first and second scan lines 12 and 14, respectively, and the emission control driver 220 may supply the emission control signal EM to the emission control line 16.

Each of the scan driver 210 and the emission control driver 220 may operate by receiving a plurality of gate control signals supplied through the timing controller 400 through the level shifter 500.

The data driver 300 may convert digital data supplied together with data control signals from the timing controller 400 into analog data signals and supply the data voltage Vdata to the data line 22 of the display panel 100. The data driver 300 may subdivide a plurality of reference gamma voltages supplied from the gamma voltage generator 600 and convert the digital data into analog data voltages by using the subdivided gamma voltages.

Also, the data driver 300 may generate the plurality of mode control signals SH and PR and supply the generated mode control signals SH and PR to the plurality of mode control lines 42 and 44 of the display panel 100, respectively. Alternatively, the plurality of mode control signals SH and PR may be generated by a mode controller (not shown) separate from the data driver 300 and supplied to the display panel 100 through a circuit film on which the data drive IC is packaged.

The timing controller 400 may control the gate driver 200 and the data driver 300 by using timing control signals supplied from a host system and timing setup information stored therein.

The timing controller 400 may generate and supply a plurality of gate control signals for controlling a driving timing of the gate driver 200 to the gate driver 200. Alternatively, the timing controller 400 may generate control signals for timing control and supply the control signals to the level shifter 500 so that the level shifter 500 may generate a plurality of gate control signals and supply the gate control signals to the gate driver 200.

The timing controller 400 may generate a plurality of data control signals for controlling driving timing of the data driver 300 and supply the generated data control signals to the data driver 300. Alternatively, the timing controller 400 may perform various kinds of image processing, such as image quality correction, deterioration correction, and luminance correction for power consumption reduction by receiving input image data, and may supply the image-processed data to the data driver 300.

The level shifter 500 may generate a plurality of gate control signals by level shifting or logic processing the control signals for timing control supplied from the timing controller 400 and supply the generated gate control signals to the scan driver 210 and the emission control driver 220.

The gamma voltage generator 600 may generate a plurality of reference gamma voltages corresponding to gamma characteristics of the display apparatus under the control of the timing controller 400 and supply the generated reference gamma voltages to the data driver 300.

The power management circuit 700 may generate and supply a plurality of driving voltages for the operation of all circuit elements of the display apparatus by using an input voltage. That is, the power management circuit 700 may generate a first power voltage EVDD, a second power voltage EVSS, and an initialization voltage Vref and supply the generated voltages to the display panel 100. Also, the power management circuit 700 may generate and supply various driving voltages for the operation of the gate driver 200, the data driver 300, the timing controller 400, the level shifter 500, and the gamma voltage generator 600.

Figure 2A:
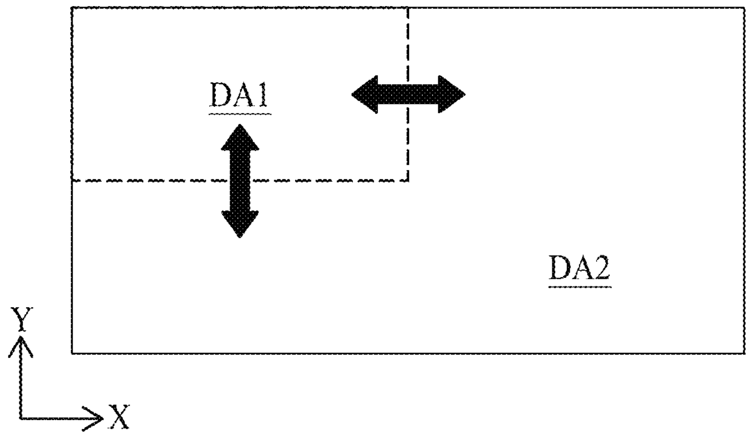
FIGS. 2A and 2B are views illustrating various forms in which a ratio of first and second display areas may be changed in a display apparatus according to an example embodiment of the present disclosure.
Figure 2B:
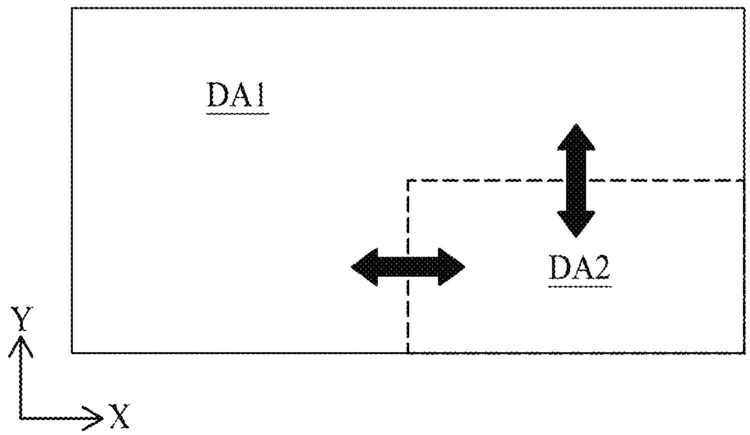

FIGS. 2A and 2B are views illustrating various forms in which a ratio of first and second display areas DA1 and DA2 may be changed in a display apparatus according to an example embodiment of the present disclosure.

As illustrated in FIGS. 2A and 2B, the display area DA of the display panel 100 may include first and second display areas DA1 and DA2. The first display area DA1 may be a first mode (SH) area according to the first mode control signal SH, and the second display area DA2 may be a second mode (PR) area according to the second mode control signal PR. For example, the first mode (SH) area may be a share mode area, and the second mode (PR) area may be a privacy mode area.

In FIGS. 2A and 2B, the first direction X may be expressed as a left-right direction, a horizontal direction, a parallel direction, or an X-axis direction. Also, the second direction Y is a direction perpendicular to the first direction X, and may be expressed as an up and down direction, a vertical direction, a perpendicular direction, or a Y-axis direction.

As shown in FIG. 2A, the first display area DA1 may be an area extended from left and upper ends of the display area DA in the first and second directions X and Y, and the second display area DA2 may be an area excluding the first display area DA1 from the entire display area DA. Also, the first display area DA1 may be extended in the first direction X to a right end of the display area DA. Also, the first display area DA1 may be extended in the second direction Y to a lower end of the display area DA.

As shown in FIG. 2B, the second display area DA2 may be an area extended from the right and lower ends of the display area DA in the first and second directions X and Y, and the first display area DA1 may be an area excluding the second display area DA2 in the entire display area DA. Also, the second display area DA2 may be extended in the first direction X to the left end of the display area DA. Also, the second display area DA2 may be extended in the second direction Y to the upper end of the display area DA.

In addition to the illustrated examples of FIGS. 2A and 2B, the ratio and sizes of the first and second display areas DA1 and DA2 may vary in various forms along the first and second directions X and Y.

Figure 3:
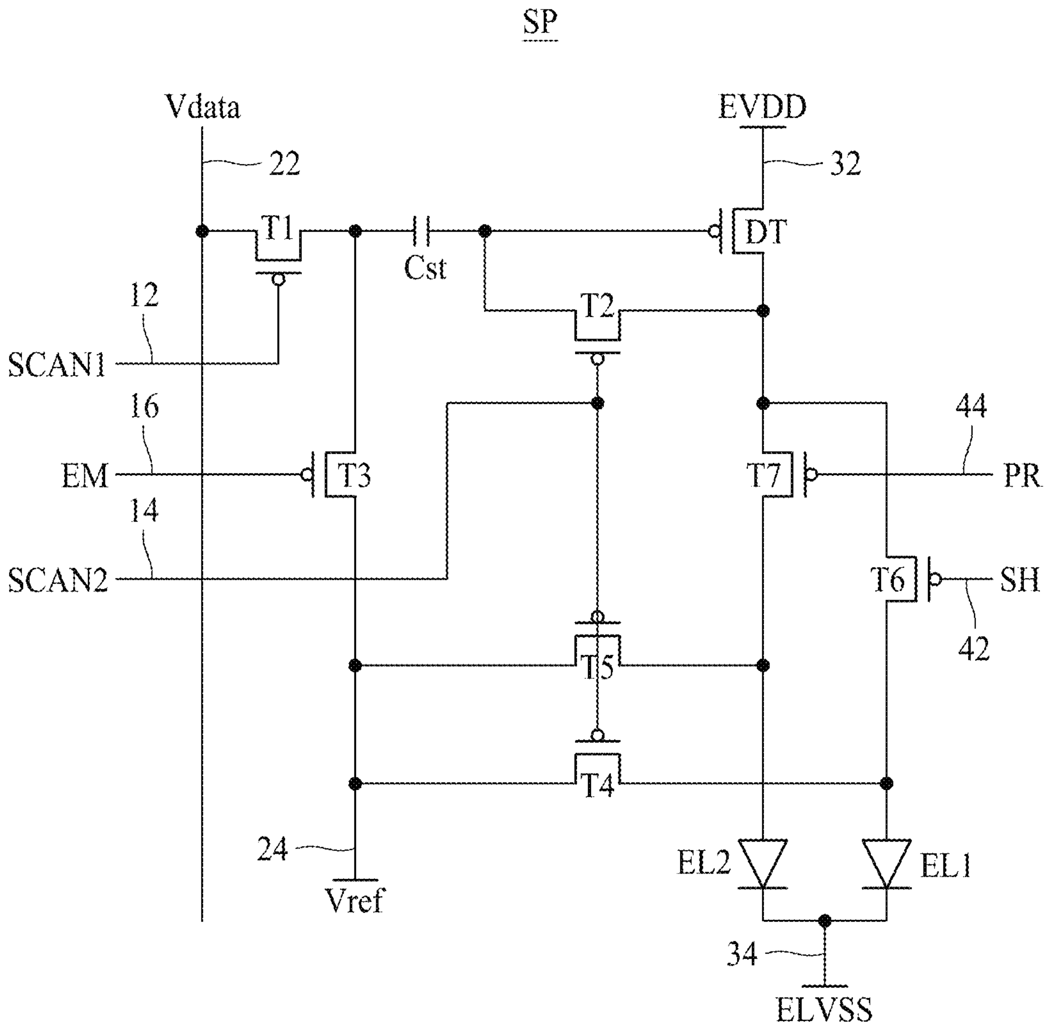
FIG. 3 is a circuit diagram illustrating one example subpixel of a display apparatus according to an example embodiment of the present disclosure.

FIG. 3 is a circuit view illustrating one example subpixel SP of a display apparatus according to an example embodiment of the present disclosure.

One subpixel SP may include a plurality of transistors DT and T1 to T7, a plurality of light emitting elements EL1 and EL2, and a storage capacitor Cst. The plurality of transistors DT and T1 to T7 may include a driving transistor DT and the first to the seventh switching transistors T1 to T7.

Each of the plurality of transistors DT and T1 to T7 of each subpixel SP includes a gate electrode, a source electrode, and a drain electrode. Since the source electrode and the drain electrode may be changed, without being fixed, depending on a direction of a voltage and a current, which are applied to the gate electrode, one of the source electrode and the drain electrode may be expressed as a first electrode, and the other may be expressed as a second electrode.

The plurality of light emitting elements EL1 and EL2 may include the first and second light emitting elements EL1 and EL2. The first light emitting element EL1 may include an anode connected with the sixth switching transistor T6 and a cathode supplied with the second power voltage EVSS from the second power line 34. In addition, the second light emitting element EL2 may include an anode connected with the seventh switching transistor T7 and a cathode supplied with the second power voltage EVSS from the second power line 34.

The first light emitting element EL1 may be supplied with the driving current from the driving transistor DT through the sixth switching transistor T6, and the second light emitting element EL2 may be supplied with the driving current from the driving transistor DT through the seventh switching transistor T7. Therefore, the first and second light emitting elements EL1 and EL2 may emit light of brightness proportional to a current value of the driving current.

The first electrode of the driving transistor DT may be connected with the first power line 32 for supplying the first power voltage EVDD. As described above, the first power voltage EVDD may be supplied from the power management circuit 700. The second electrode of the driving transistor DT may be connected with the first electrodes of the sixth and seventh switching transistors T6 and T7. The driving transistor DT may drive the first light emitting element EL1 through the sixth switching transistor T6 and may drive the second light emitting element EL2 through the seventh switching transistor T7.

The driving transistor DT may control the emission intensity of the first and second light emitting elements EL1 and EL2 through the sixth and seventh switching transistors T6 and T7, respectively, by controlling a driving current Ids in accordance with a driving voltage Vgs of the driving transistor DT.

The storage capacitor Cst may be connected between the gate electrode and the second electrode of the driving transistor DT to charge the driving voltage Vgs corresponding to the data voltage Vdata. During a non-emission period, the storage capacitor Cst may maintain the charged driving voltage Vgs and supply the same to the driving transistor DT.

The first switching transistor T1 may operate according to the first scan signal SCAN1 applied through the first scan line 12. Also, the first switching transistor T1 may supply the data voltage Vdata supplied through the data line 22 to the first electrode of the storage capacitor Cst.

The second switching transistor T2 may operate in accordance with the second scan signal SCAN2 applied through the second scan line 14. In addition, the second switching transistor T2 may charge the storage capacitor Cst with a threshold voltage Vth of the driving transistor DT.

The third switching transistor T3 may operate in accordance with the emission control signal EM. The third switch transistor T3 may supply the initialization voltage Vref supplied through the initialization voltage line 24 to the first electrode of the storage capacitor Cst.

The fourth and fifth switching transistors T4 and T5 may operate in accordance with the second scan signal SCAN2. The fourth and fifth switching transistors T4 and T5 may supply the initialization voltage Vref supplied through the initialization voltage line 24 to the anodes of the first and second light emitting elements EL1 and EL2, respectively.

The sixth and seventh switching transistors T6 and T7 may operate in accordance with the first and second mode control signals SH and PR. The first electrodes of the sixth and seventh switching transistors T6 and T7 may be connected to the driving transistor DT, and the second electrodes of the sixth and seventh switching transistors T6 and T7 may be connected with the first and second light emitting elements EL1 and EL2, respectively.

The first and second mode control signals SH and PR may be supplied from the data driver 300 or a mode controller (not shown). When each subpixel SP is operated in the first mode SH, the first mode control signal SH may be activated by a gate-on voltage, and the second mode control signal PR may be deactivated by a gate-off voltage. In addition, when each subpixel SP is operated in the second mode PR, the first mode control signal SH may be deactivated by the gate-off voltage, and the second mode control signal PR may be activated by the gate-on voltage.

Figure 4:
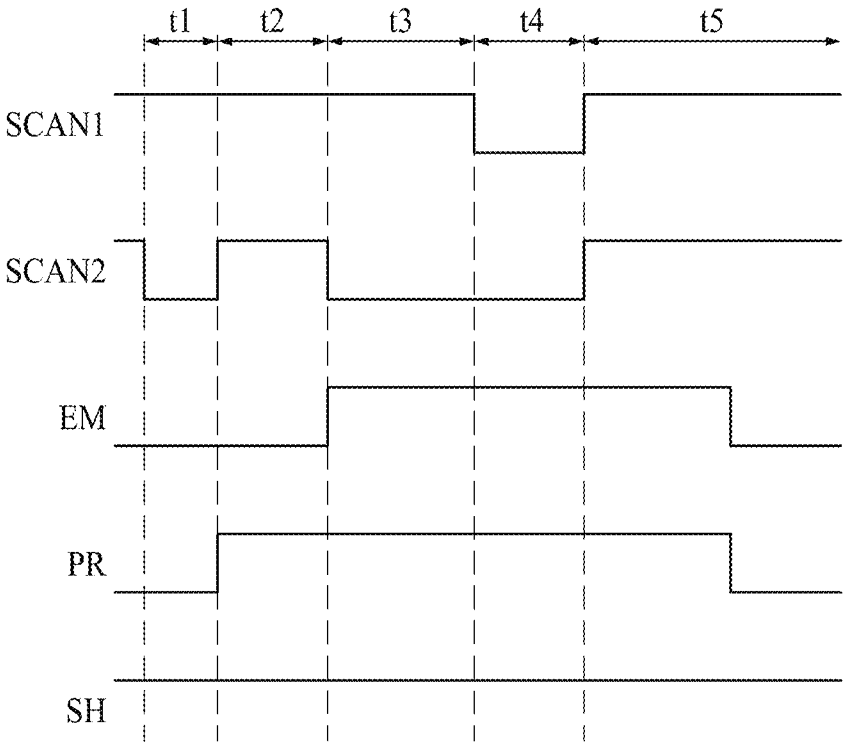
FIG. 4 is a view illustrating a driving waveform of an example subpixel of a display apparatus according to an example embodiment of the present disclosure.

FIG. 4 is a view illustrating a driving waveform of an example subpixel SP of a display apparatus according to an example embodiment of the present disclosure. Each of the subpixels SP may be driven by being divided into the first to the fifth periods T1 to T5. The first to the fifth periods T1 to T5 may be continuous without overlapping each other. A driving process of the subpixel SP will be described in detail with reference to FIGS. 5 to 9.

Figure 5:
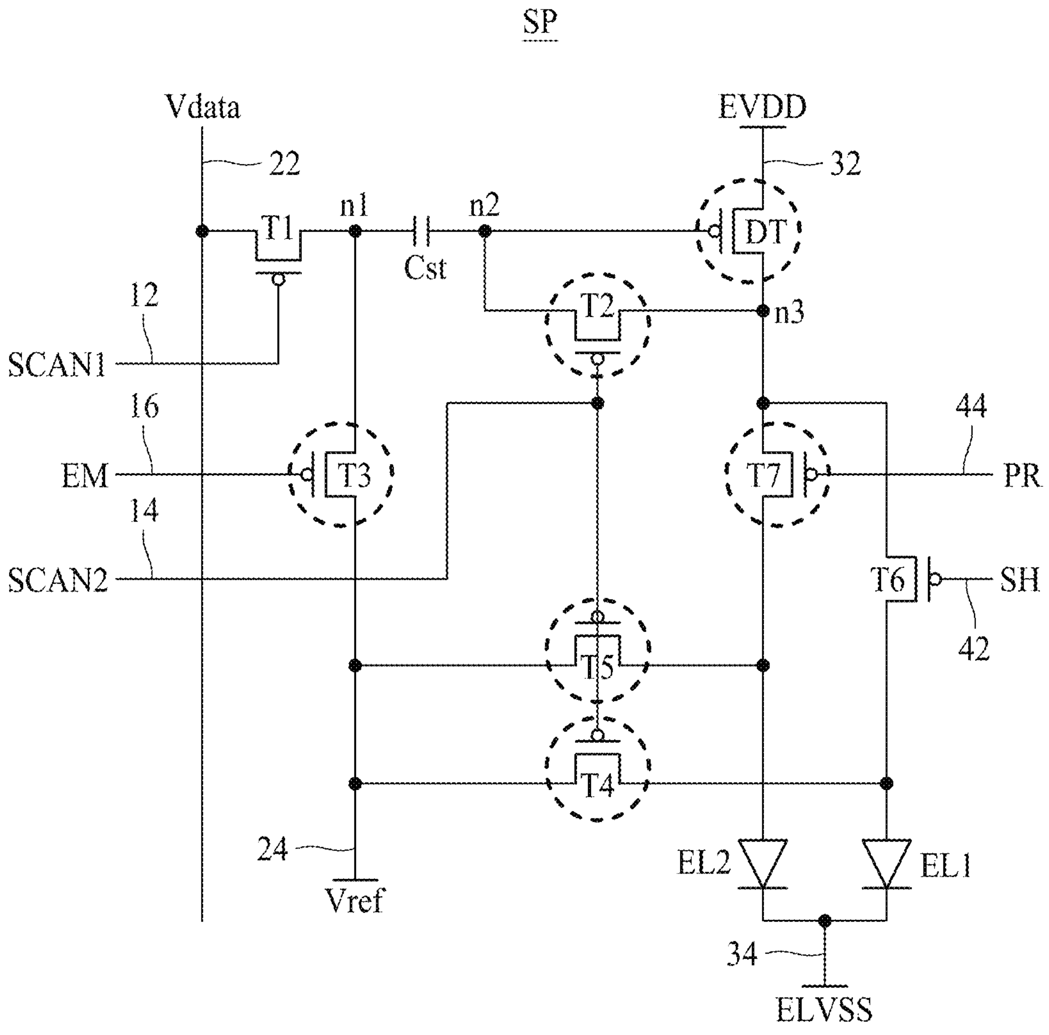
FIG. 5 is a view illustrating circuit driving, in a first period, of an example subpixel of a display apparatus according to an example embodiment of the present disclosure.

FIG. 5 is a view illustrating circuit driving, in a first period t1, of an example subpixel of a display apparatus according to an example embodiment of the present disclosure. The first period t1 may be referred to as an initial period.

At the first period t1, the emission control signal EM of a low voltage state is applied so that the third switching transistor T3 may be turned on. Therefore, the initialization voltage Vref applied to the initialization voltage line 24 may be applied to a first node n1.

The second scan signal SCAN2 of a low voltage state is applied so that the second, fourth, and fifth switching transistors T2, T4 and T5 may be turned on. In addition, the second mode control signal PR of a low voltage state is applied so that the seventh switching transistor T7 may be turned on. Therefore, the initialization voltage Vref applied to the initialization voltage line 24 may be applied to second and third nodes n2 and n3.

In this case, since the first and second terminals of the storage capacitor Cst are respectively connected with the first and second nodes n1 and n2, the first and second terminals of the storage capacitor Cst may be initialized to the initialization voltage Vref. Also, since the gate electrode and the second electrode of the driving transistor DT are respectively connected with the second and third nodes n2 and n3, each of the gate electrode and the second electrode of the driving transistor DT may be initialized to the initialization voltage Vref.

The initialization voltage Vref may be selected within a voltage range sufficiently lower than driving voltages of the first and second light emitting elements EL1 and EL2, and may be set to a voltage equal to or lower than that of the second power voltage EVSS. That is, a potential difference between the initialization voltage Vref applied to the anodes of the first and second light emitting elements EL1 and EL2 and the second power voltage EVSS applied to the cathode may be lower than threshold voltages of the first and second light emitting elements EL1 and EL2. Therefore, since no current flows to the second light emitting element EL2 even though the seventh switching transistor T7 is turned on during the first period t1, the first and second light emitting elements EL1 and EL2 may not emit light.

In addition, although FIG. 5 shows the seventh switching transistor T7 turned on by applying the second mode control signal PR of a low voltage state, the sixth switching transistor T6 may be turned on and used by applying the first mode control signal SH of a low voltage state.

Figure 6:
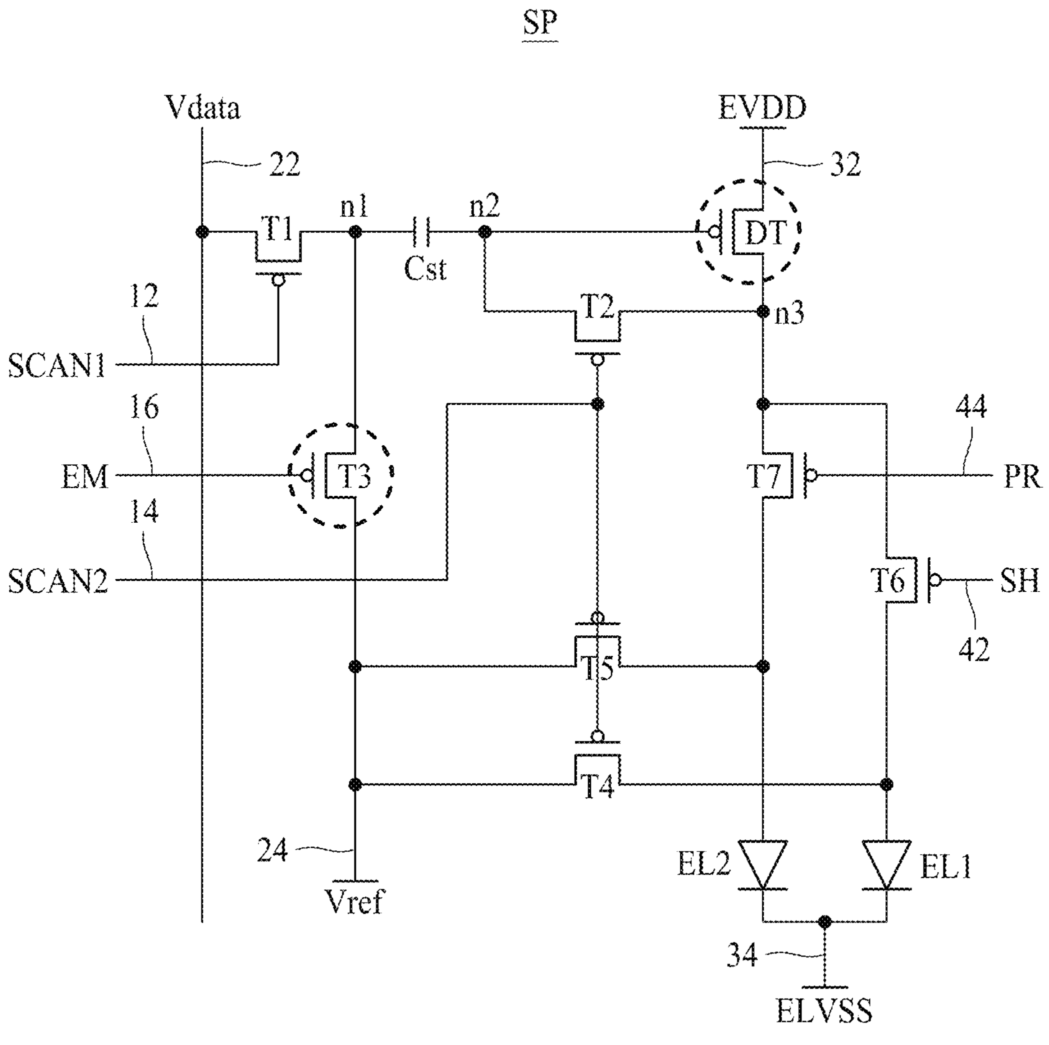
FIG. 6 is a view illustrating circuit driving, in a second period, of an example subpixel of a display apparatus according to an example embodiment of the present disclosure.

FIG. 6 is a view illustrating circuit driving, in a second period t2, of an example subpixel of a display apparatus according to an example embodiment of the present disclosure. The second period t2 may be referred to as an on-bias stress (OBS) period. The OBS period may be a period at which a bias voltage is directly applied to the driving transistor DT.

At the second period t2, the emission control signal EM may maintain a low voltage state, and the second scan signal SCAN2 and the second mode control signal PR may be changed from a low voltage state to a high voltage state. Therefore, the third switching transistor T3 may maintain a turn-on state, and the second, fourth, fifth, and seventh switching transistors T2, T4, T5, and T7 may be changed from a turn-on state to a turn-off state.

Also, the driving transistor DT turned on at the first period t1 may maintain the turn-on state even at the second period t2. In this case, since all of the second, fourth, fifth, and seventh switching transistors T2, T4, T5, and T7 are in a turn-off state, the third node n3 may be at an open state. That is, the second electrode of the driving transistor DT connected to the third node n3 may be also at the open state. In this case, since the first electrode of the driving transistor DT is in a state in which the first power voltage EVDD is applied, the second electrode of the driving transistor DT may be changed from the initialization voltage Vref to the first power voltage EVDD. That is, the voltage of the second electrode of the driving transistor DT may be increased.

Therefore, the first power voltage EVDD having a voltage greater than the initialization voltage Vref may be applied to the third node n3 at the second period t2 as compared with the case where the initialization voltage Vref is applied to the third node n3 at the first period t1. Therefore, as compared with the first period t1, an OBS effect may be improved at the second period t2.

In detail, due to hysteresis characteristics of the driving transistor DT, the threshold voltage Vth of the driving transistor DT may be changed by a value of the gate-source voltage Vgs of the driving transistor DT. However, by applying the first power voltage EVDD to the first and second electrodes of the driving transistor DT during the second period t2, the gate-source voltage Vgs of the driving transistor DT may be biased to a specific voltage, and the source-drain current Ids may flow to the driving transistor DT.

Therefore, in an example embodiment of the present disclosure, the bias voltage may be applied to the driving transistor DT through the existing first power voltage EVDD without forming a power source for additionally applying a voltage. As a result, the example embodiment of the present disclosure may alleviate the hysteresis of the driving transistor DT.

Figure 7:
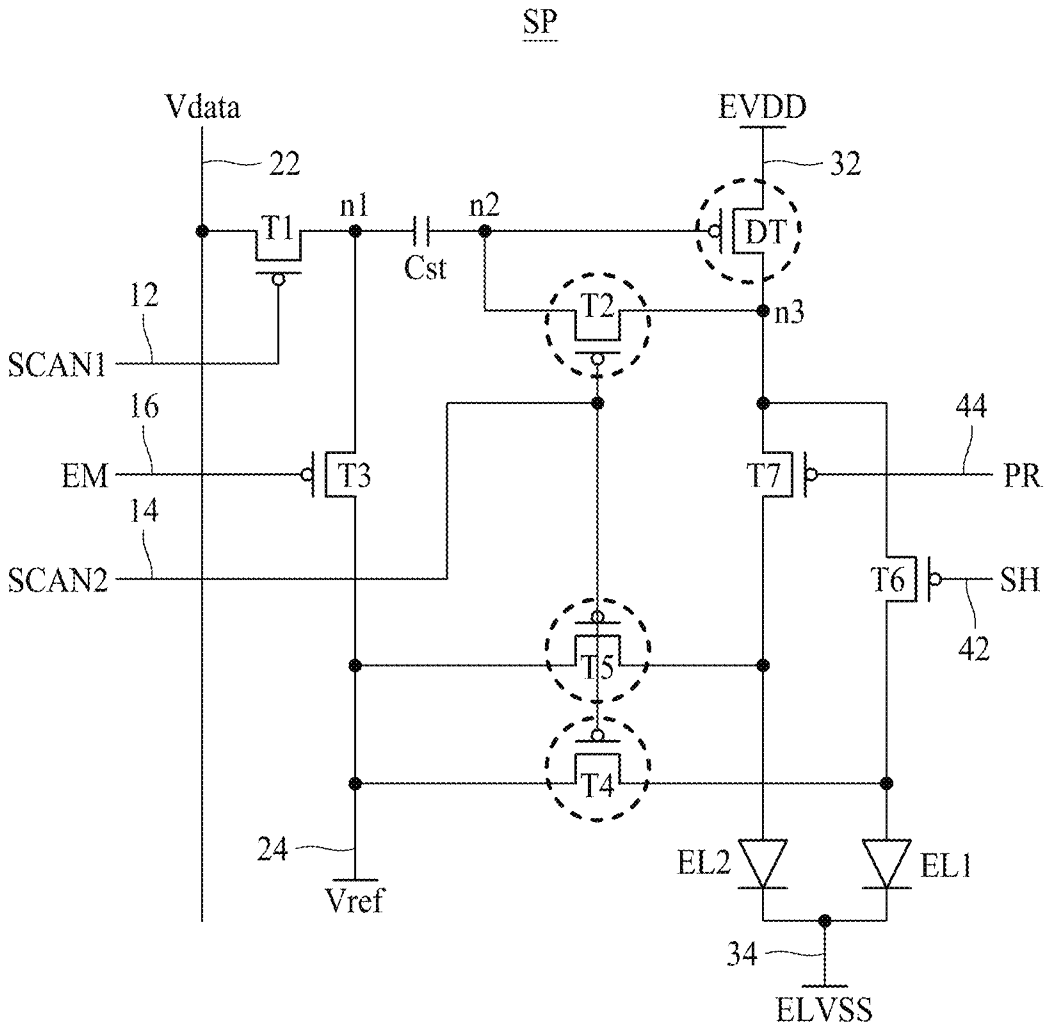
FIG. 7 is a view illustrating circuit driving, in a third period, of an example subpixel of a display apparatus according to an example embodiment of the present disclosure.

FIG. 7 is a view illustrating circuit driving, in a third period t3, of an example subpixel of a display apparatus according to an example embodiment of the present disclosure. The third period t3 may be referred to as a sampling period.

At the third period t3, the emission control signal EM may be changed from a low voltage state to a high voltage state, and the second scan signal SCAN2 may be changed from a high voltage state to a low voltage state. Therefore, the third switching transistor T3 may be changed from a turn-on state to a turn-off state, and the second, fourth, and fifth switching transistors T2, T4, and T5 may be changed from a turn-off state to a turn-on state.

The third switching transistor T3 may be changed to a turn-off state, and the driving transistor DT may be in a diode-connected state. That is, the gate electrode and the second electrode of the driving transistor DT are connected to each other, and the driving transistor DT may operate like a diode. In this case, at the third period t3, the source-drain current Ids may flow to the driving transistor DT. Since the gate electrode and the drain electrode of the driving transistor DT are in a diode-connected state, a voltage of the second node n2 may be increased by the current flowing from the source electrode to the drain electrode until the gate-source voltage Vgs of the driving transistor DT reaches the threshold voltage Vth. That is, during the third period t3, the voltage of the second node n2 may be charged with a voltage EVDD−|Vth| corresponding to a difference between the first power voltage EVDD and the threshold voltage Vth of the driving transistor DT. That is, the threshold voltage Vth of the driving transistor DT may be sampled. Also, since the gate-source voltage Vgs of the driving transistor DT is increased until it reaches the threshold voltage Vth, the driving transistor DT may be turned off.

Figure 8:
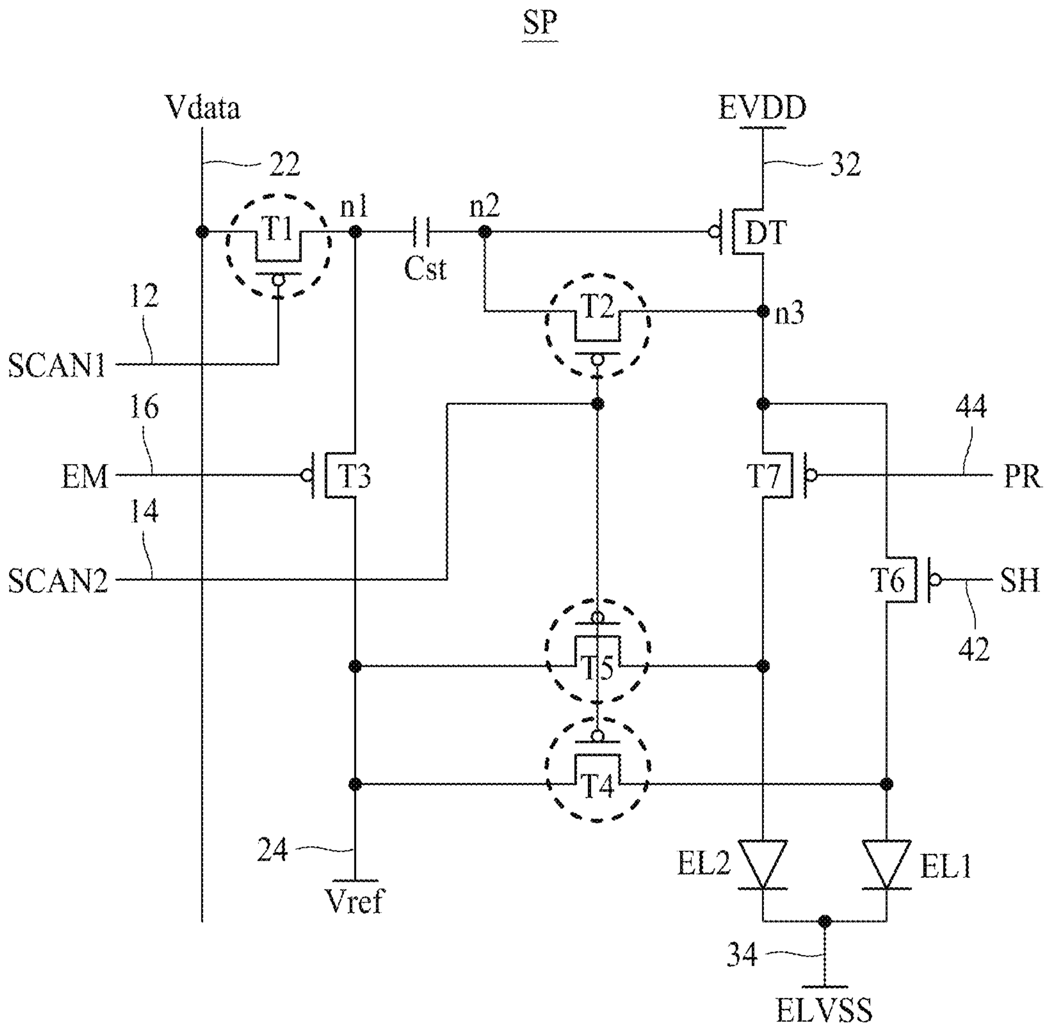
FIG. 8 is a view illustrating circuit driving, in a fourth period, of an example subpixel of a display apparatus according to an example embodiment of the present disclosure.

FIG. 8 is a view illustrating circuit driving, in a fourth period t4, of an example subpixel of a display apparatus according to an example embodiment of the present disclosure. The fourth period t4 may be referred to as a data period.

At the fourth period t4, the first scan signal SCAN1 may be changed from a high voltage state to a low voltage state. Therefore, the first switching transistor T1 may be changed from a turn-off state to a turn-on state. In addition, the third switching transistor T3 may maintain a turn-off state, and the second, fourth, and fifth switching transistors T2, T4, and T5 may maintain a turn-on state.

In addition, the driving transistor DT may be maintained in a turn-off state. Therefore, a voltage of the second node n2 may maintain a difference voltage EVDD−|Vth| between the first power voltage EVDD and the threshold voltage Vth.

Since the first switching transistor T1 is turned on, the data voltage Vdata may be applied to the first electrode of the storage capacitor Cst. Therefore, the storage capacitor Cst may store a voltage EVDD−|Vth|−Vdata corresponding to a difference between the data voltage Vdata and the difference voltage EVDD−|Vth|.

Figure 9:
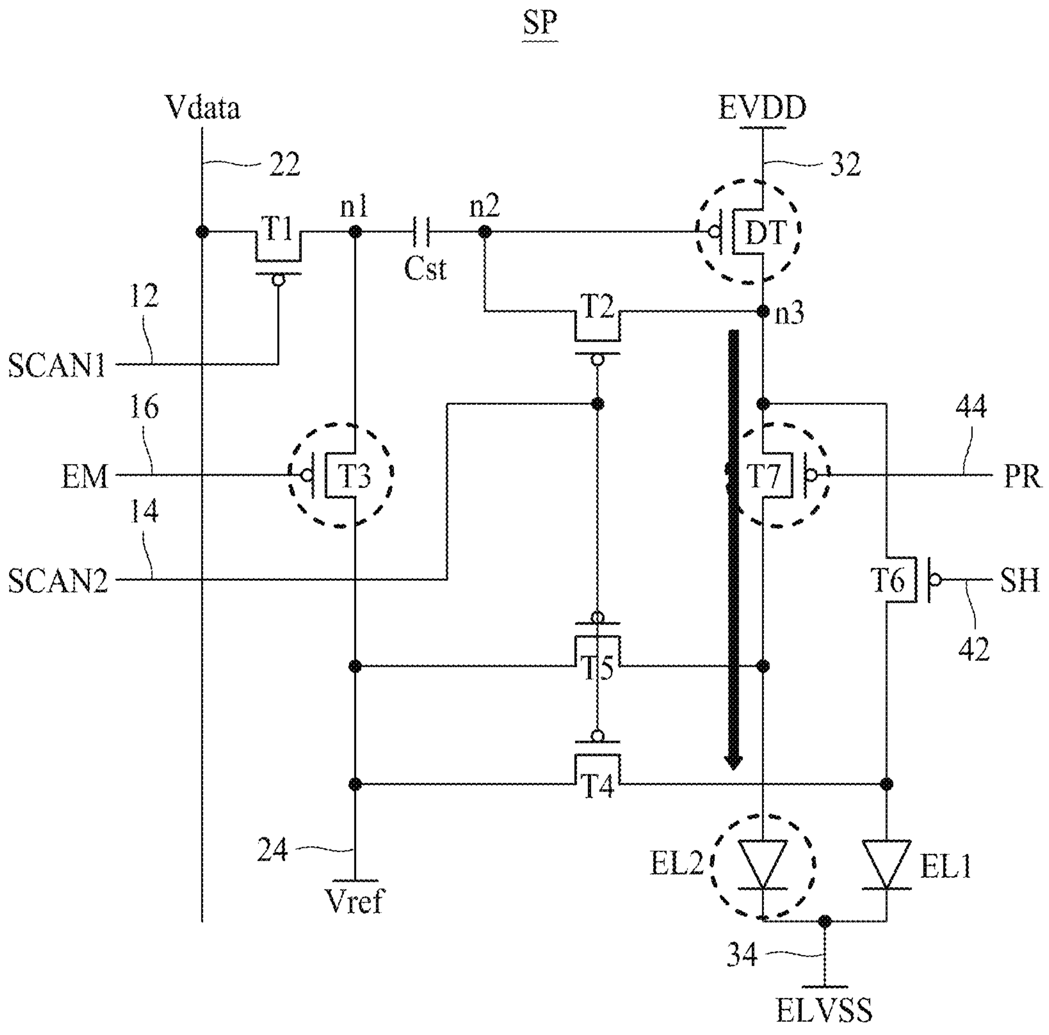
FIG. 9 is a view illustrating circuit driving, in a fifth period, of an example subpixel of a display apparatus according to an example embodiment of the present disclosure.

FIG. 9 is a view illustrating circuit driving, in a fifth period t5, of an example subpixel of a display apparatus according to an example embodiment of the present disclosure. The fifth period t5 may be referred to as an emission period.

At the fifth period t5, the first and second scan signals SCAN1 and SCAN2 may be changed from a low voltage state to a high voltage state, and the emission control signal EM and the second mode control signal PR may be changed from a high voltage state to a low voltage state. Therefore, the first, second, fourth, and fifth switching transistors T1, T2, T4, and T5 may be changed from a turn-on state to a turn-off state. Also, the third and seventh switching transistors T3 and T7 may be changed from a turn-off state to a turn-on state.

Since the third switching transistor T3 is turned on, the second electrode of the storage capacitor Cst may be connected with the gate electrode of the driving transistor DT. Therefore, the driving transistor DT may be turned so that the source-drain current Ids may flow. In addition, since the seventh switching transistor T7 is turned on, the source-drain current (or the driving current) Ids may flow to the second light emitting element EL2 through the seventh switching transistor T7. Therefore, the second light emitting element EL2 may emit light.

Also, although FIG. 9 discloses that the second light emitting element EL2 emits light based on the driving current Ids flowing through the seventh switching transistor T7, the first light emitting element EL1 may emit light based on the driving current Ids flowing through the sixth switching transistor T6 by applying the first mode control signal SH of a low voltage state to turn on the sixth switching transistor T6.

In this case, since the second electrode of the driving transistor DT is applied with the first power voltage EVDD through the second period t2, the second electrode of the driving transistor DT may be at the first power voltage EVDD even in the fifth period t5. Therefore, in comparison with a case where the second electrode of the transistor DT is at the initialization voltage Vref, when the sixth or seventh switching transistor T6 or T7 is turned on, the amount of time for charging the anode of the first or second light emitting element EL1 or EL2 may be reduced. As a result, according to an example embodiment of the present disclosure, since the light emitting element may be driven in a state where the second electrode of the driving transistor DT is at the first power voltage EVDD, the response speed of the subpixel SP may be improved.

Figure 10:
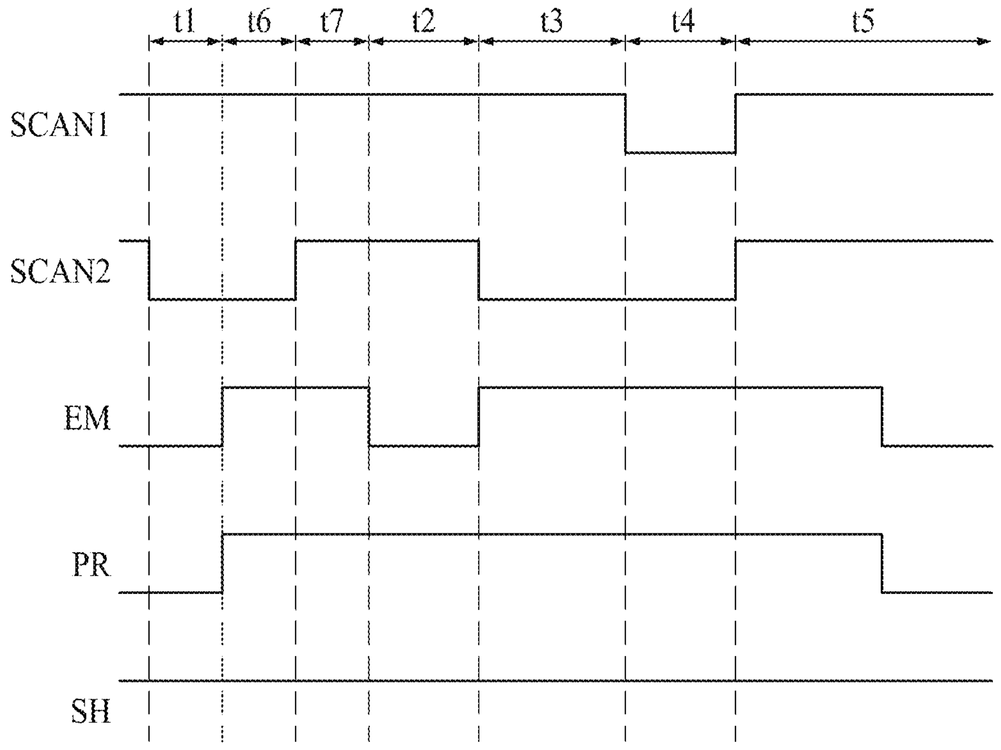
FIG. 10 is a view illustrating a driving waveform of an example subpixel of a display apparatus according to another example embodiment of the present disclosure.

FIG. 10 is a view illustrating a driving waveform of a subpixel of a display apparatus according to another example embodiment of the present disclosure.

In comparison with FIG. 4, the sixth and seventh periods t6 and t7 may be additionally performed between the first and second periods t1 and t2. The sixth and seventh periods t6 and t7 may be continuously performed without overlap between the first and second periods t1 and t2.

Figure 11:
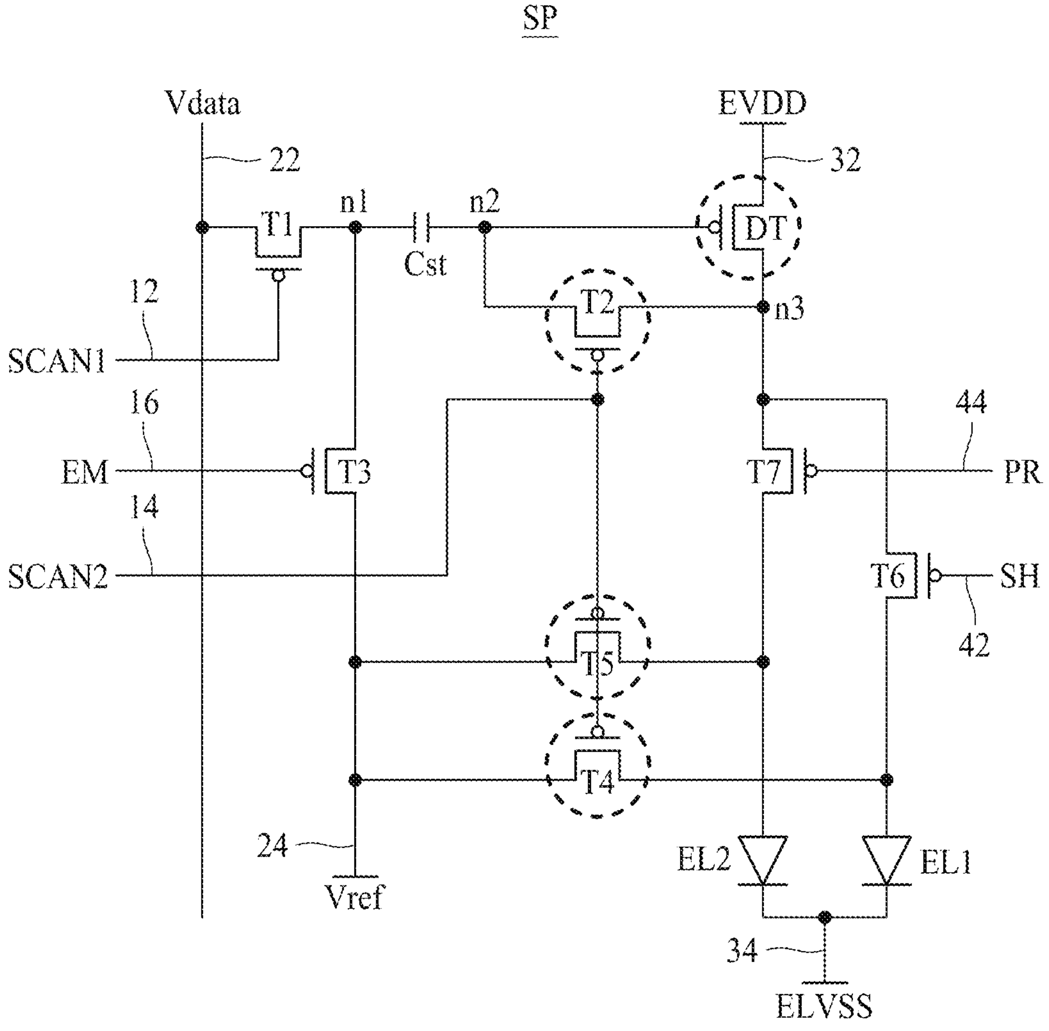
FIG. 11 is a view illustrating circuit driving, in a sixth period, of an example subpixel of a display apparatus according to an example embodiment of the present disclosure.

FIG. 11 is a view illustrating circuit driving, in a sixth period t6, of an example subpixel of a display apparatus according to an example embodiment of the present disclosure.

At the sixth period t6, the first and second scan signals SCAN1 and SCAN2 may be maintained in a state of the first period t1, and the emission control signal EM and the second mode control signal PR may be changed from a low voltage state to a high voltage state. Therefore, the third and seventh switching transistors T3 and T7 may be changed from a turn-on state to a turn-off state. As a result, the gate electrode of the driving transistor DT may be disconnected from the initialization voltage line 24 for supplying an initialization voltage Vref, and the second electrode of the driving transistor DT may be disconnected from the second light emitting element EL2.

Figure 12:
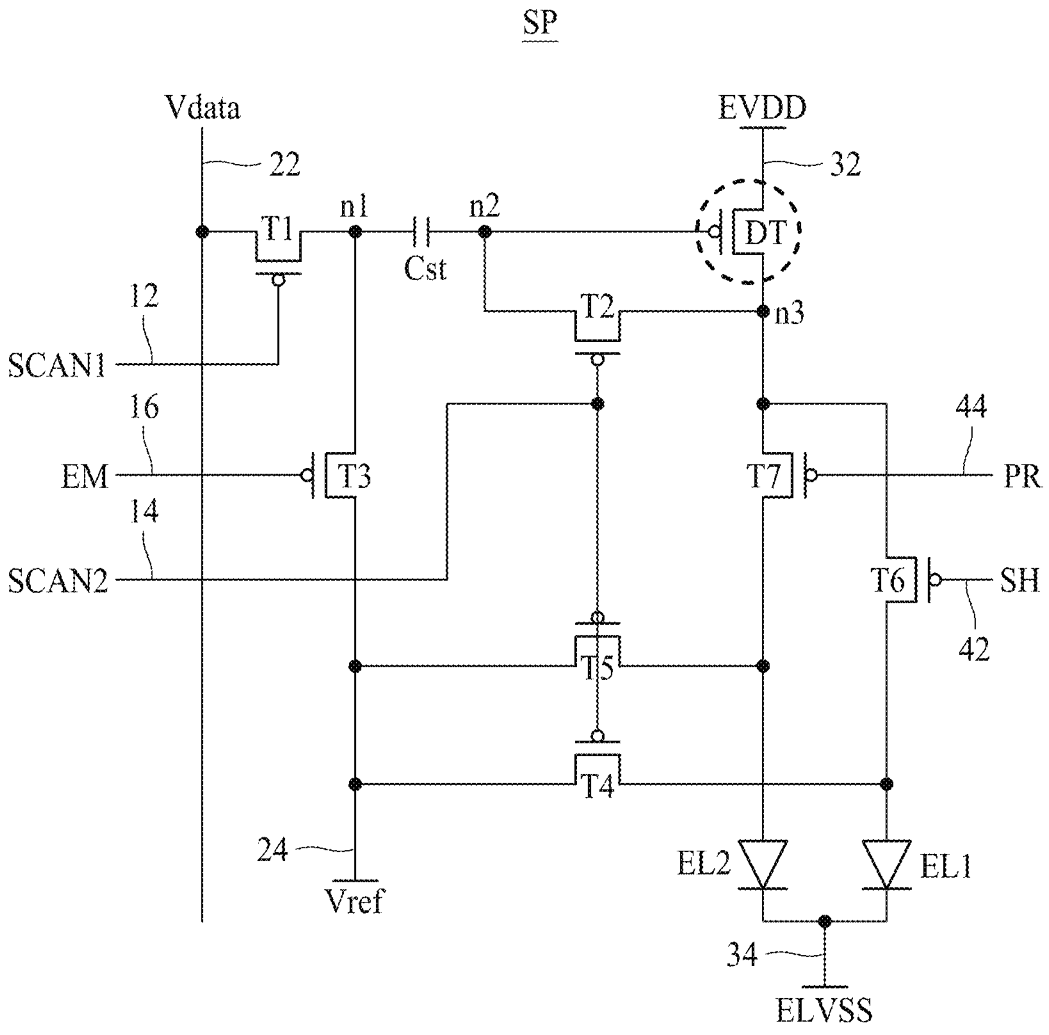
FIG. 12 is a view illustrating circuit driving, in a seventh period, of an example subpixel of a display apparatus according to an example embodiment of the present disclosure.

FIG. 12 is a view illustrating circuit driving, in a seventh period t7, of an example subpixel of a display apparatus according to an example embodiment of the present disclosure.

At the seventh period t7, the second scan signal SCAN2 may be changed from a low voltage state to a high voltage state. Therefore, the second, fourth, and fifth switching transistors T2, T4, and T5 may be changed from a turn-on state to a turn-off state. As a result, the gate electrode of the driving transistor DT may be disconnected from the second electrode of the driving transistor DT, and the anodes of the first and second light emitting elements EL1 and EL 2 may be disconnected from the initialization voltage line 24 for supplying an initialization voltage Vref.

That is, in another example embodiment of the present disclosure, the switching transistors connected with each electrode of the driving transistor DT may be sequentially turned off through the sixth and seventh periods t6 and t7. Therefore, after the sixth and seventh periods t6 and t7, when the emission control signal EM is again applied at the second period t2 to turn on third switch transistor T3, the initialization voltage line 24 for supplying an initialization voltage Vref may be more stably connected with the gate electrode of the driving transistor DT through the third switch transistor T3. As a result, the subpixel SP may be more stably driven.

According to example embodiments of the present disclosure, the following advantageous effects may be obtained.

According to example embodiments of the present disclosure, the on-bias voltage may be applied to the driving transistor through the high potential power voltage, so that the response speed of the subpixel may be improved.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display apparatus, comprising:

a display panel having a display area including a plurality of subpixels, at least one of the plurality of subpixels including:

- a driving transistor having a first electrode connected to a first power line configured to receive a first power voltage;
- a first switching transistor connected to a data line and having a gate electrode configured to receive a first scan signal;
- a second switching transistor connected between a gate electrode and a second electrode of the driving transistor and having a gate electrode configured to receive a second scan signal; and
- a third switching transistor connected with the gate electrode of the driving transistor and having a gate electrode configured to receive an emission control signal.

2. The display apparatus of claim 1, wherein the at least one of the plurality of subpixels further includes:

a fourth switching transistor and a fifth switching transistor each having a gate electrode configured to receive the second scan signal;

a sixth switching transistor and a seventh switching transistor each having a first electrode connected with the second electrode of the driving transistor;

a storage capacitor connected between the first switching transistor and the gate electrode of the driving transistor;

a first light emitting element connected with a second electrode of the sixth switching transistor; and a second light emitting element connected with a second electrode of the seventh switching transistor.

3. The display apparatus of claim 2, wherein:

the sixth switching transistor has a gate electrode configured to receive a first mode signal, and the seventh switching transistor has a gate electrode configured to receive a second mode signal; and the first and second light emitting elements are configured not to emit light at the same time.

4. The display apparatus of claim 2, wherein:

the fourth switching transistor has a first electrode connected with the third switching transistor and a second electrode connected with the sixth switching transistor; and the fifth switching transistor has a first electrode connected with the third switching transistor and a second electrode connected with the seventh switching transistor.

5. The display apparatus of claim 1, wherein:

the at least one of the plurality of subpixels further includes:

a storage capacitor connected between the first switching transistor and the gate electrode of the driving transistor; and a light emitting element connected between the second electrode of the driving transistor and a second power line configured to receive a second power voltage;

the at least one of the plurality of subpixels is configured to be driven in first to fifth periods;

during the first period, the first switching transistor is configured to be in a turn-off state, and the second and third switching transistors are configured to be in a turn-on state to initialize a voltage stored in the storage capacitor;

during a second period after the first period, the second electrode of the driving transistor is configured to be in an open state;

during a third period after the second period, a threshold voltage of the driving transistor is configured to be sampled;

during a fourth period after the third period, the first switching transistor is configured to be in a turn-on state to apply a data voltage on the data line to the storage capacitor; and during a fifth period after the fourth period, the light emitting element is configured to emit light.

6. The display apparatus of claim 1, wherein:

the third switching transistor is connected between the gate electrode of the driving transistor and an initialization voltage line configured to receive an initialization voltage; and during a first period, the second and third switching transistors are configured to be in a turn-on state to apply the initialization voltage to the gate electrode and the second electrode of the driving transistor.

7. The display apparatus of claim 6, wherein during a second period after the first period:

the third switching transistor is configured to be in the turn-on state, and the second switching transistor is configured to be in a turn-off state; and a voltage at the second electrode of the driving transistor is configured to be increased from the initialization voltage.

8. The display apparatus of claim 7, wherein during the second period;

the first electrode of the driving transistor is configured to receive the first power voltage; and the voltage at the second electrode of the driving transistor is configured to be increased to equal the first power voltage.

9. The display apparatus of claim 7, wherein, during a third period after the second period, the third switching transistor is configured to be in a turn-off state, and the second switching transistor is configured to be in the turn-on state.

10. The display apparatus of claim 9, wherein, during fourth period after the third period:

the second switching transistor is configured to be in the turn-on state; and the first switching transistor is configured to be in the turn-on state so that a data voltage applied to the data line is applied to the gate electrode of the driving transistor through the first switching transistor.

11. The display apparatus of claim 10, wherein:

the at least one of the plurality of subpixels further includes:

a fourth switching transistor or a fifth switching transistor having a gate electrode configured to receive the second scan signal; and a sixth switching transistor or a seventh switching transistor having a first electrode connected with the second electrode of the driving transistor; and during a fifth period after the fourth period, the first and second switching transistors are configured to be in the turn-off state, and the third switching transistor and one of the sixth and seventh switching transistors connected with the second electrode of the driving transistor is configured to be in the turn-on state.

12. The display apparatus of claim 11, wherein:

the at least one of the plurality of subpixels further includes a first light emitting element connected with a second electrode of the sixth switching transistor or a second light emitting element connected with a second electrode of the seventh switching transistor; and during the fifth period, the first or second light emitting element is configured to emit light.

13. The display apparatus of claim 7, wherein:

during a sixth period after the first period and before the second period, the first switching transistor is configured to be at the turn-off state, the second switching transistor is configured to be at the turn-on state, and the third switching transistor is configured to be at a turn-off state.

14. The display apparatus of claim 13, wherein:

during a seventh period after the sixth period and before the second period, the first switching transistor is configured to be at the turn-off state, the second switching transistor is configured to be at the turn-off state, and the third switching transistor is configured to be at a turn-off state.

15. A display apparatus, comprising:

a display panel including a plurality of subpixels, at least one of the plurality of subpixels including:

a first switching transistor having a gate electrode configured to receive a first scan signal, a first electrode connected to a data line, and a second electrode connected to a first node;

a driving transistor having a gate electrode connected to a second node, a first electrode connected to a first power line configured to receive a first power voltage, and a second electrode connected to a third node;

a second switching transistor having a gate electrode configured to receive a second scan signal, a first electrode connected to the second node, and a second electrode connected to the third node;

a third switching transistor having a gate electrode configured to receive an emission control signal, a first electrode connected to the first node, and a second electrode connected to an initialization voltage line configured to receive an initialization voltage;

a storage capacitor connected between the first node and the second node; and at least one light emitting element connected between the third node and a second power line configured to receive a second power voltage.

16. The display apparatus of claim 15, wherein:

during a first period, the first scan signal is configured to be at a gate-off voltage, the second scan signal is configured to be at a gate-on voltage, and the emission control signal is configured to be at a gate-on voltage; and during a second period after the first period, the first scan signal is configured to be at the gate-off voltage, the second scan signal is configured to be at a gate-off voltage, and the emission control signal is configured to be at the gate-on voltage.

17. The display apparatus of claim 16, wherein:

during a third period after the second period, the first scan signal is configured to be at the gate-off voltage, the second scan signal is configured to be at the gate-on voltage, and the emission control signal is configured to be at a gate-off voltage;

during a fourth period after the third period, the first scan signal is configured to be at a gate-on voltage, the second scan signal is configured to be at the gate-on voltage, and the emission control signal is configured to be at the gate-off voltage; and during a fifth period after the fourth period, the first scan signal is configured to be at the gate-off voltage, the second scan signal is configured to be at the gate-off voltage, and the emission control signal is configured to be at the gate-on voltage.

18. The display apparatus of claim 16, wherein:

during a sixth period after the first period and before the second period, the first scan signal is configured to be at the gate-off voltage, the second scan signal is configured to be at the gate-on voltage, and the emission control signal is configured to be at a gate-off voltage.

19. The display apparatus of claim 18, wherein:

during a seventh period after the sixth period and before the second period, the first scan signal is configured to be at the gate-off voltage, the second scan signal is configured to be at a gate-off voltage, and the emission control signal is configured to be at the gate-off voltage.

20. The display apparatus of claim 15, wherein the at least one of the plurality of subpixels further includes:

a fourth switching transistor having a gate electrode configured to receive the second scan signal, a first electrode connected to the initialization voltage line, and a second electrode connected to an anode of a first light emitting element among the at least one light emitting element;

a fifth switching transistor having a gate electrode configured to receive the second scan signal, a first electrode connected to the initialization voltage line, and a second electrode connected to an anode of a second light emitting element among the at least one light emitting element;

a sixth switching transistor having a gate electrode configured to receive a first mode signal, a first electrode connected to the third node, and a second electrode connected to the anode of the first light emitting element; and a seventh switching transistor having a gate electrode configured to receive a second mode signal, a first electrode connected to the third node, and a second electrode connected to the anode of the second light emitting element.

* * * * *